US012241295B1

(12) United States Patent
Harrell

(10) Patent No.: US 12,241,295 B1
(45) Date of Patent: Mar. 4, 2025

(54) BREAKAWAY SLIDING DOOR SYSTEM

(71) Applicant: Schlage Lock Company LLC, Carmel, IN (US)

(72) Inventor: K James Harrell, Everett, WA (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/243,278

(22) Filed: Sep. 7, 2023

(51) Int. Cl.
*E05D 15/48* (2006.01)
*E05D 15/06* (2006.01)

(52) U.S. Cl.
CPC ..... *E05D 15/0604* (2013.01); *E05D 15/0652* (2013.01); *E05D 2015/485* (2013.01); *E05Y 2201/60* (2013.01); *E05Y 2900/531* (2013.01)

(58) Field of Classification Search
CPC ............ E05D 15/0604; E05D 15/0652; E05D 2015/485; E05Y 2201/60; E05Y 2900/531
USPC ............................................................ 49/141
See application file for complete search history.

(56) References Cited

U.S. PATENT DOCUMENTS 3,303,612 A * 2/1967 Baker ..................... E05D 15/58 49/127
4,646,471 A * 3/1987 Shaiu ...................... E05D 15/06 49/411
6,526,695 B1 * 3/2003 Nguyen .................. E05D 15/58 49/260
7,117,637 B2 * 10/2006 Delgado ................. E06B 9/581 49/141
7,222,457 B2 * 5/2007 Delgado ............. E05D 15/0621 49/141
7,367,159 B2 * 5/2008 Delgado ............... E05D 15/565 49/366
7,861,475 B2 * 1/2011 Sprague .............. E05B 65/0085 52/64
8,096,342 B2 * 1/2012 Scruggs .................. E05D 15/08 160/218
8,443,549 B2 * 5/2013 Salvietti .................. E05D 15/48 49/141
8,756,864 B2 * 6/2014 Hamaker ................ E05D 15/48 49/168

(Continued)

FOREIGN PATENT DOCUMENTS

EP 4261376 A1 * 10/2023 ............. E05D 15/58

OTHER PUBLICATIONS

International Search Report; US Patent and Trademark Office; International PCT Application No. PCT/US2024/045815; Jan. 16, 2025; 2 pages.

(Continued)

*Primary Examiner* — Jerry E Redman
(74) *Attorney, Agent, or Firm* — Taft Stettinius & Hollister LLP

(57) ABSTRACT

An exemplary sliding door system, generally includes a frame assembly and a door assembly. The frame assembly is configured for mounting to a wall, and includes a top rail and a guide mechanism. The door assembly is mounted to the frame assembly for sliding movement between a closed linear position and an open linear position, and includes a movable rail and a wing. The movable rail is movably supported by the top rail, and the wing is pivotably mounted to the movable rail. A bottom edge of the wing includes a channel, and the guide mechanism projects into the channel and guides movement of the wing.

20 Claims, 13 Drawing Sheets

(56) References Cited

U.S. PATENT DOCUMENTS

| | | | | |
|---|---|---|---|---|
| 8,756,865 | B2 * | 6/2014 | Nicholson | E05D 15/48<br>49/180 |
| 9,637,970 | B1 * | 5/2017 | Rendon, Jr. | E06B 3/5054 |
| 9,765,557 | B2 * | 9/2017 | Lecot | E05D 15/565 |
| 10,415,289 | B2 * | 9/2019 | Hailey | E05D 15/58 |
| 10,851,569 | B2 * | 12/2020 | Narvaez | E06B 3/509 |
| 10,954,707 | B2 * | 3/2021 | Hailey | E05D 15/581 |
| 11,098,514 | B2 * | 8/2021 | Vander Bent, Jr. | E05D 15/58 |
| 11,920,403 | B2 * | 3/2024 | Bernhagen | E06B 3/5072 |
| 2007/0069524 | A1 * | 3/2007 | Lin | E05C 19/028<br>292/175 |
| 2008/0250716 | A1 * | 10/2008 | Ranaudo | E06B 3/4636<br>49/31 |
| 2012/0255230 | A1 * | 10/2012 | Smith | E06B 3/5063<br>49/257 |
| 2014/0331558 | A1 * | 11/2014 | Smith | E06B 3/5063<br>49/176 |
| 2016/0251885 | A1 * | 9/2016 | Conley | E05F 11/42<br>49/127 |

OTHER PUBLICATIONS

Written Opinion of the International Searching Authority; US Patent and Trademark Office; International Application No. PCT/US2024/045815; Jan. 16, 2025; 6 pages.

* cited by examiner

BREAKAWAY SLIDING DOOR SYSTEM

TECHNICAL FIELD

The present disclosure generally relates to breakaway sliding doors, and more particularly but not exclusively relates to top-hung breakaway sliding doors lacking a bottom track.

BACKGROUND

Sliding door systems typically include a wing that linearly slides in directions parallel to the broad faces of the wing between an open linear position and a closed linear position. Certain sliding door systems include breakaway features that permit the wing to swing between an open pivotal position and a closed pivotal position. However, many conventional breakaway door systems suffer from one or more drawbacks or limitations, such as those related to the requirement for a bottom track, the inability to selectively prevent the breakaway function, and/or the inability of the breakaway function to be activated from both sides of the wing.

In many circumstances, it can be desirable to selectively prevent the breakaway function in a breakaway sliding door system. For example, it may be desirable to permit the breakaway function only when the door is in its fully closed position. In order to provide such functionality, many existing breakaway sliding door systems require a bottom track or another form of sill on the floor. However, in many situations, such floor sills can bring disadvantages. In addition to the fact that floor sills are often seen as aesthetically unpleasing, such sills also frequently provide a gathering area for debris and contaminants, which is particularly undesirable in hospital and other healthcare settings. Additionally, certain breakaway door systems are only capable of breaking away from the push side of the wing, which may be disadvantageous in settings in which it is desired to provide breakaway from the pull side. For these reasons among others, there remains a need for further improvements in this technological field.

SUMMARY

An exemplary sliding door system generally includes a frame assembly and a door assembly. The frame assembly is configured for mounting to a wall, and includes a top rail and a guide mechanism. The door assembly is mounted to the frame assembly for sliding movement between a closed linear position and an open linear position, and includes a movable rail and a wing. The movable rail is movably supported by the top rail, and the wing is pivotably mounted to the movable rail. A bottom edge of the wing includes a channel, and the guide mechanism projects into the channel and guides movement of the wing. Further embodiments, forms, features, and aspects of the present application shall become apparent from the description and figures provided herewith.

DETAILED DESCRIPTION OF ILLUSTRATIVE EMBODIMENTS

Figure 1:
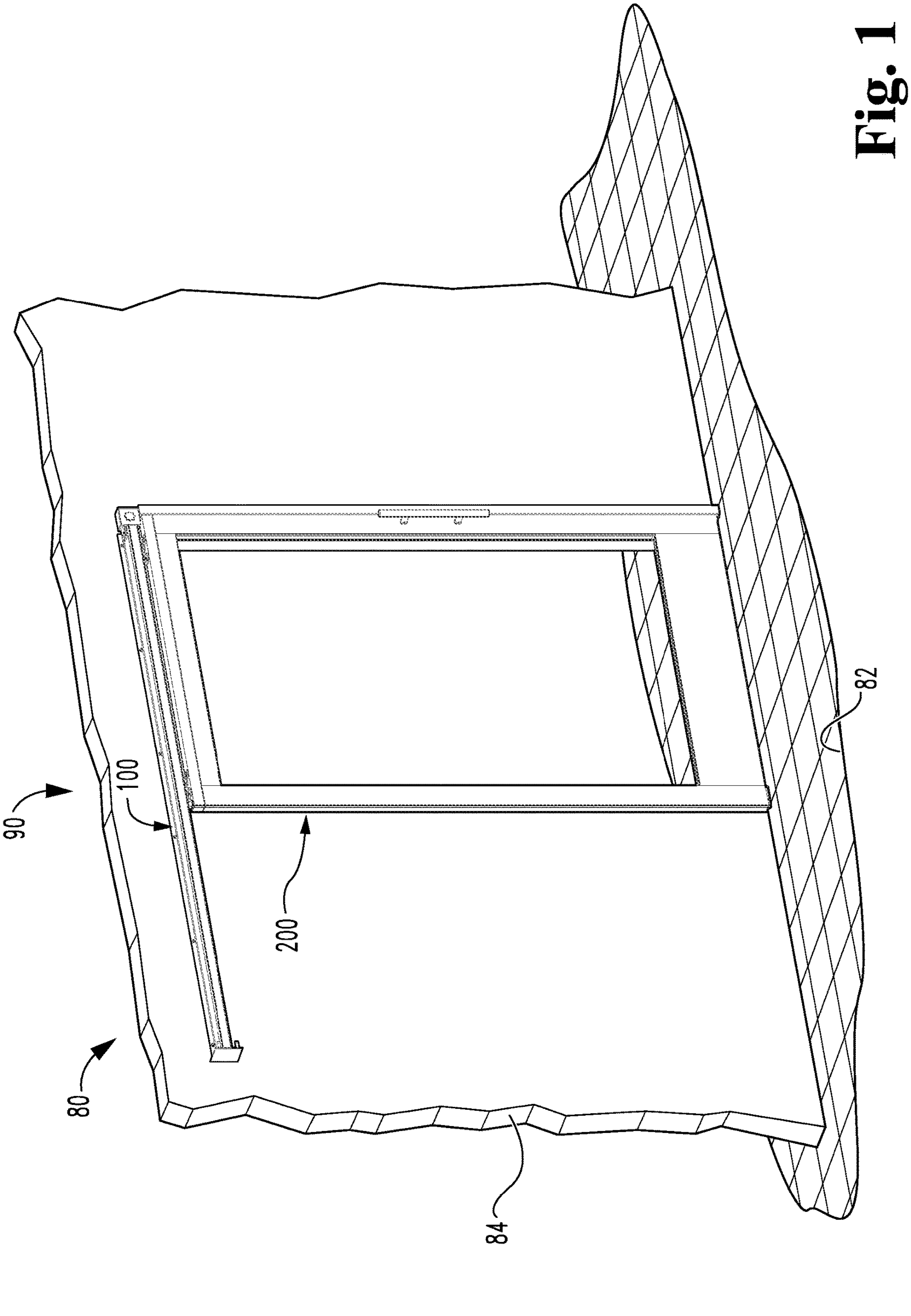
FIG. 1 is a perspective view of a closure assembly according to certain embodiments in a fully closed state.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 2:
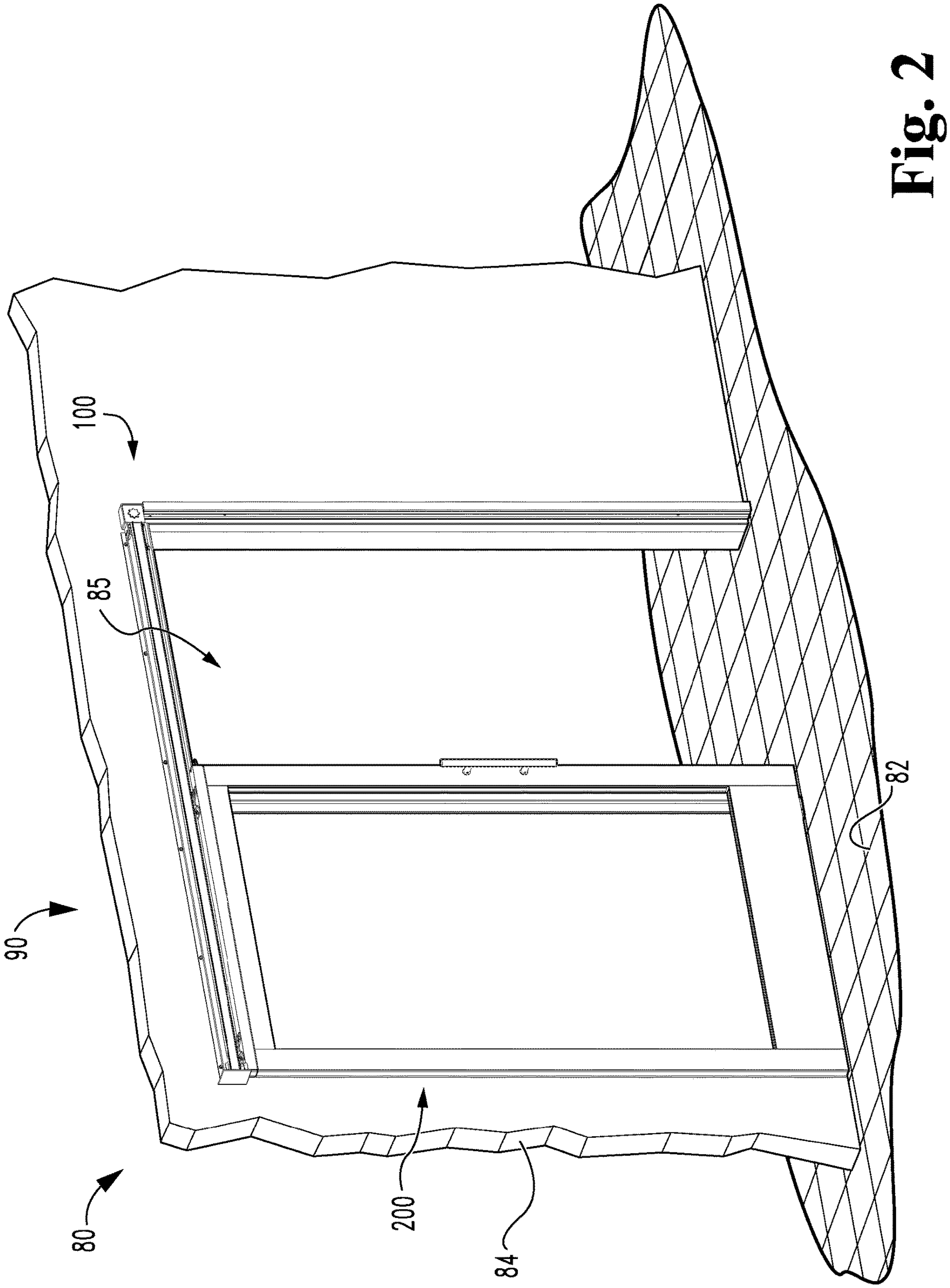
FIG. 2 is a perspective view of the closure assembly in a sliding open state.
Figure 3:
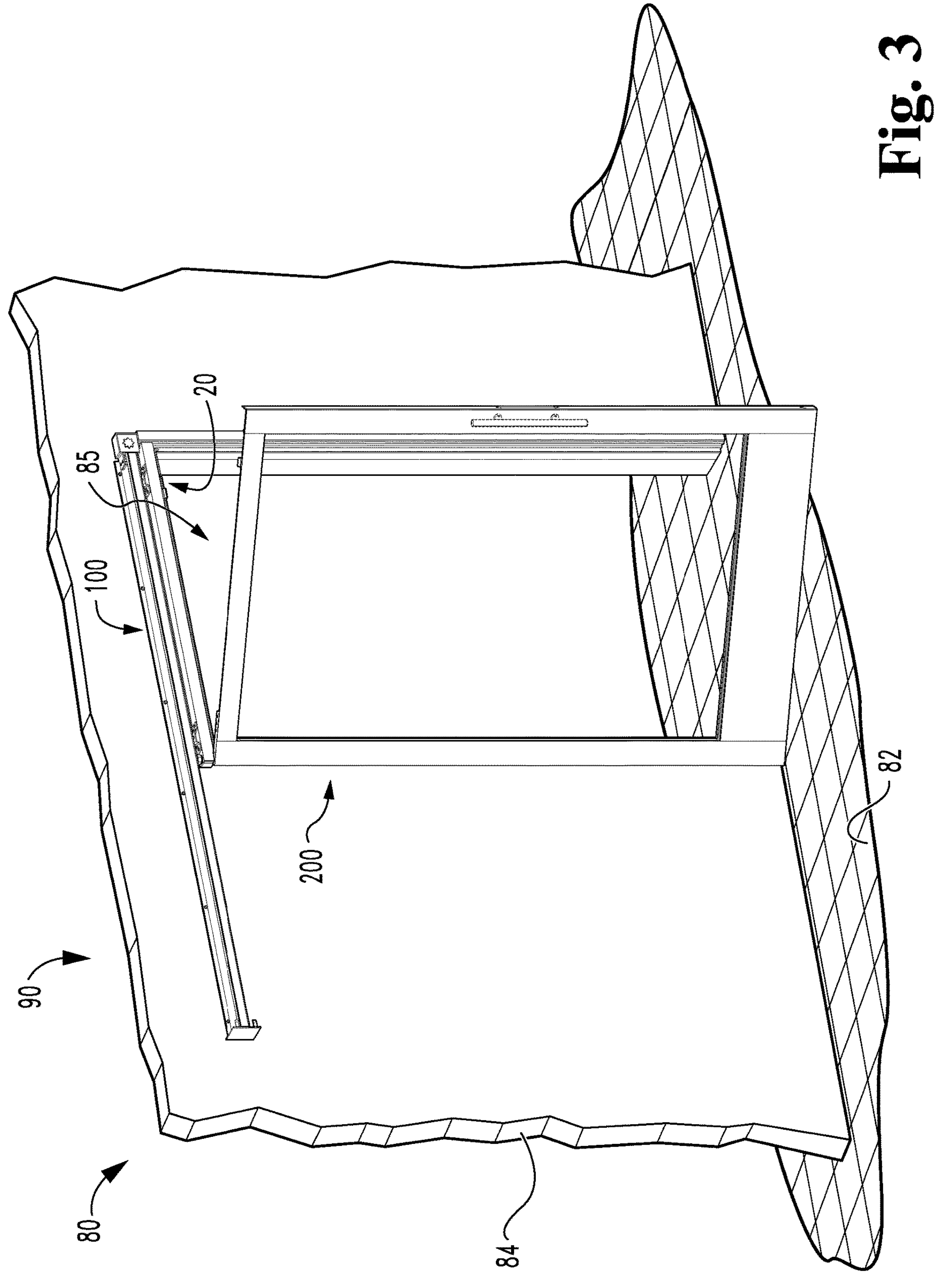
FIG. 3 is a perspective view of the closure assembly in a swinging open state.

With reference to FIGS. 1-3, illustrated therein is a closure assembly 90 according to certain embodiments installed to a static structure 80. The structure 80 includes a floor 82 and a wall 84 having an opening 85 therein, and the closure assembly 90 is operable to selectively close the opening 85. The closure assembly 90 generally includes a frame assembly 100 mounted to the structure 80, and a door assembly 200 movably mounted to the frame assembly 100. The closure assembly 90 has a fully closed state (FIG. 1), in which the door assembly 200 covers the opening 85 and prevents travel through the opening 85. The closure assembly 90 also has a plurality of open states in which the door assembly 200 does not fully cover the opening 85. As described herein, the closure assembly 90 is operable to move from the fully closed state (FIG. 1) to each of a sliding open state (FIG. 2) and a swinging open state (FIG. 3).

Figure 4:
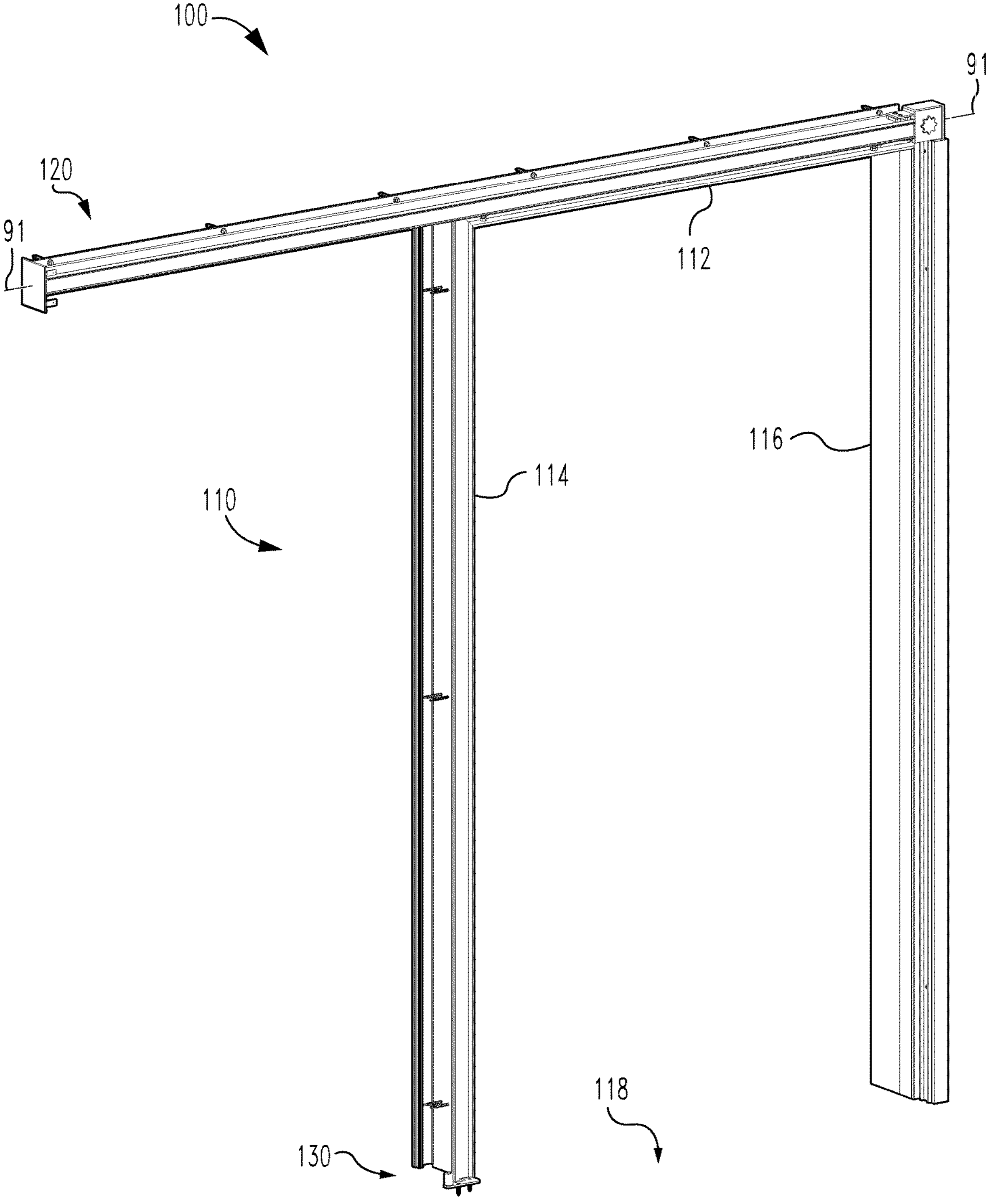
FIG. 4 is a perspective view of a frame assembly according to certain embodiments.

With additional reference to FIG. 4, the frame assembly 100 is configured for mounting to the structure 80, and generally includes a frame 110 configured for installation within the opening 85, a stationary top rail 120 configured for mounting to the wall 84 above the opening 85, and a guide mechanism 130 configured for mounting to the floor 82. The top rail 120 extends along and defines a longitudinal axis 91 of the closure assembly 90.

The frame 110 generally includes a top jamb 112, a first or proximal side jamb 114, and a second or distal side jamb 116 opposite the first or proximal side jamb 114. In the illustrated form, the frame 110 does not include a bottom track or other form of sill opposite the top jamb 112. Accordingly, the frame 110 may be considered to define an open bottom 118 opposite the top jamb 112.

Figure 5:
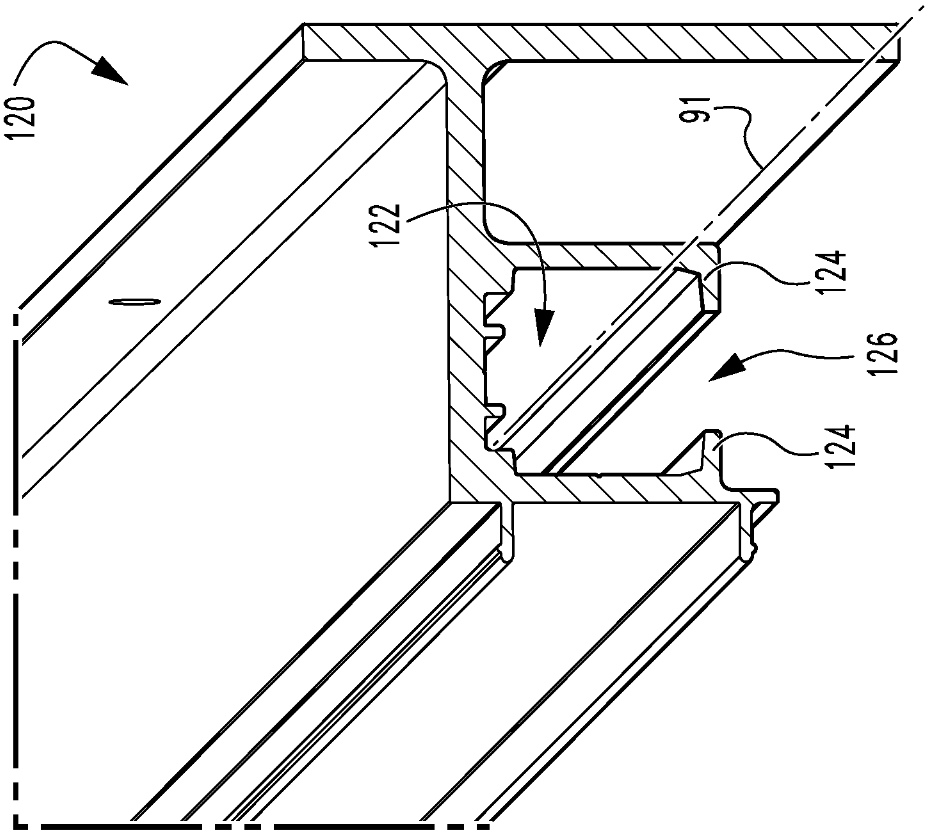
FIG. 5 is a cutaway view of a stationary top rail according to certain embodiments.

With additional reference to FIG. 5, the stationary top rail 120 is configured for mounting to the wall 84, and defines a channel 122 that extends along the longitudinal axis 91. The channel 122 is defined in part by a pair of longitudinally-extending flanges 124 that are offset from one another such that a slot 126 is defined between the flanges 124.

Figure 6:
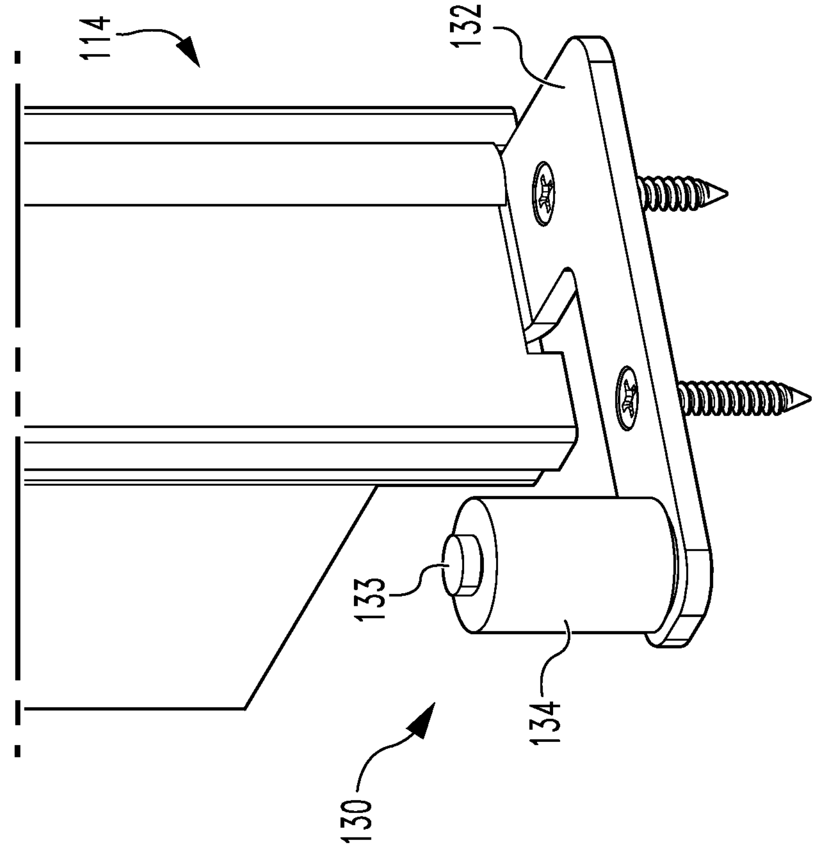
FIG. 6 is a perspective view of a guide mechanism according to certain embodiments.

With additional reference to FIG. 6, the guide mechanism 130 is configured for mounting to the floor 82 and/or the frame 110. The guide mechanism 130 generally includes a bracket 132 having a vertically-extending post 133, and in the illustrated form, further includes a bearing component 134 mounted to the post 133. In the illustrated form, the bearing component 134 is rotatably mounted to the post 133. In certain embodiments, the bearing component 134 may include roller bearings, ball bearings, or other forms of bearings. Alternatively, the bearing component 134 may be provided as a bushing. Moreover, while the illustrated bearing component 134 is rotatable relative to the post 133, it is also contemplated that the bearing component 134 may be fixed to the post 133 or integrally formed with the post 133. Moreover, it should be appreciated that the guide mechanism may be provided in another form, such as that of a cleat. As described herein, the bearing component 134 extends into a channel 234 of a wing 230 of the door assembly 200, and facilitates the opening and closing of the closure assembly 90. In the illustrated form, the guide mechanism 130 is attached to the frame 110 at or near a bottom end portion of the first or proximal side jamb 114. It is also contemplated that the guide mechanism 130 may be separate from the frame 110.

Figure 7:
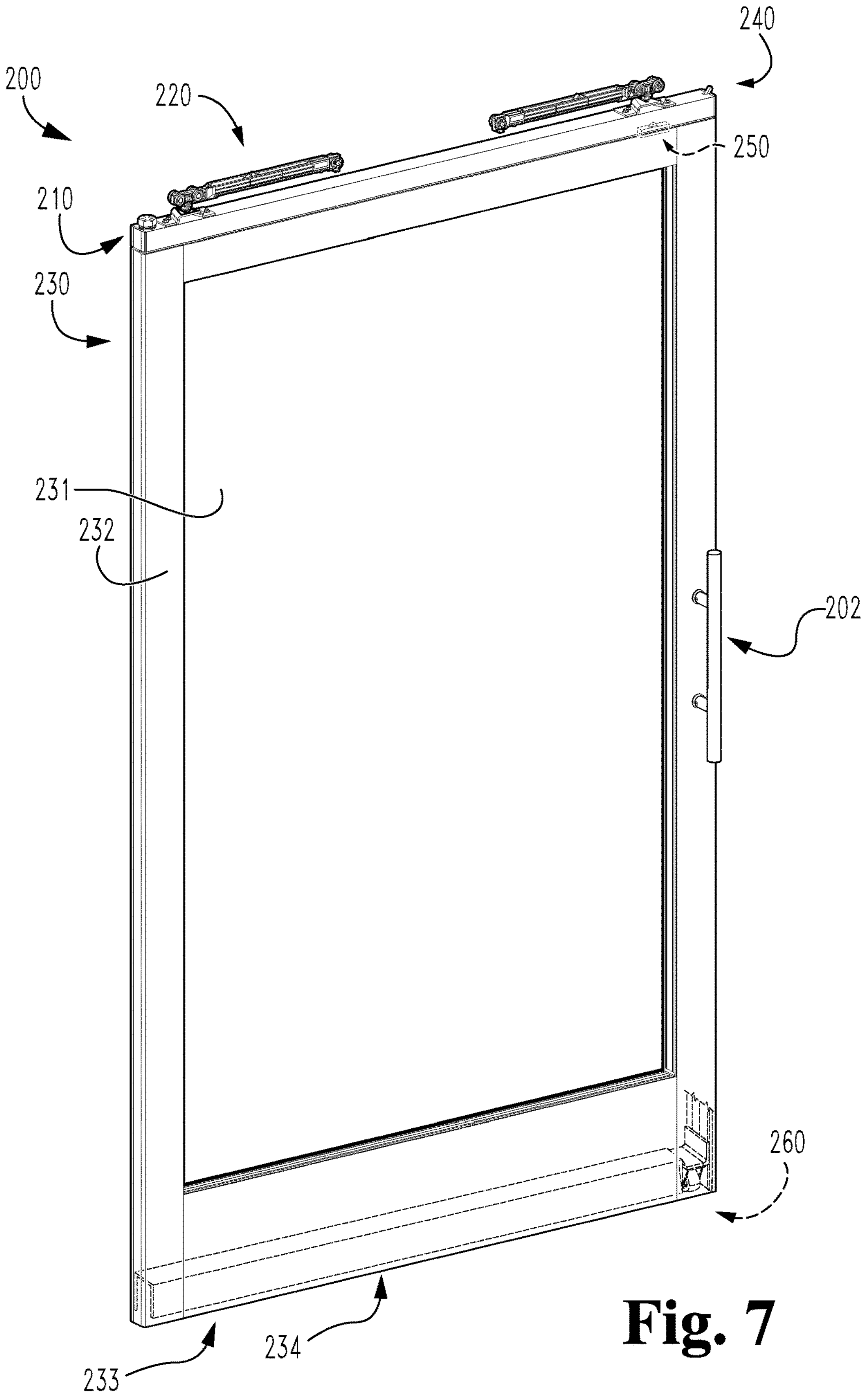
FIG. 7 is a perspective view of a door assembly according to certain embodiments.

With additional reference to FIG. 7, the door assembly 200 generally includes a movable top rail 210, a support assembly 220 through which the door assembly 200 is supported by the stationary rail 120, and a wing 230 pivotably mounted to the movable rail 210. In certain embodiments, the door assembly 200 includes at least one mechanism operable to selectively retain the wing 230 in a closed pivotal position relative to the movable rail 210. For example, the door assembly 200 may include a detent mechanism 240 operable to selectively discourage movement of the wing 230 from its closed position without preventing such opening movement. Additionally or alternatively, the door assembly 200 may include a latch 250 operable to selectively prevent movement of the wing 230 from its closed position. In the illustrated form, the door assembly 200 further includes a handle 202 configured to facilitate manual movement of the wing 230 between its fully closed position and its open positions. In certain embodiments, the door assembly 200 may include a support roller 260 configured to facilitate the swinging and/or pivotal movement of the wing 230.

As described in further detail below, during movement of the door assembly 200 between the fully closed position (FIG. 1) and the sliding open position (FIG. 2), the door assembly 200 longitudinally slides along the stationary rail 120 in a proximal opening direction (generally to the left in FIGS. 1 and 2) and a distal closing direction (generally to the right in FIGS. 1 and 2). The door assembly 200 may therefore be considered to have a closed linear position (FIGS. 1 and 3) and an open linear position (FIG. 2). During movement of the door assembly 200 between the fully closed position (FIG. 1) and the swinging open position (FIG. 3), the wing 230 pivots away from the wall 84 while the movable rail 210 remains engaged with the stationary rail 120. Accordingly, the wing 230 may be considered to have a closed pivotal position (FIGS. 1 and 2) and an open pivotal position (FIG. 3). As described herein, certain embodiments of the closure assembly 90 are configured to permit the wing 230 to pivot between the closed pivotal position and the open pivotal position only when the door assembly 200 is in the closed linear position.

Figure 8:
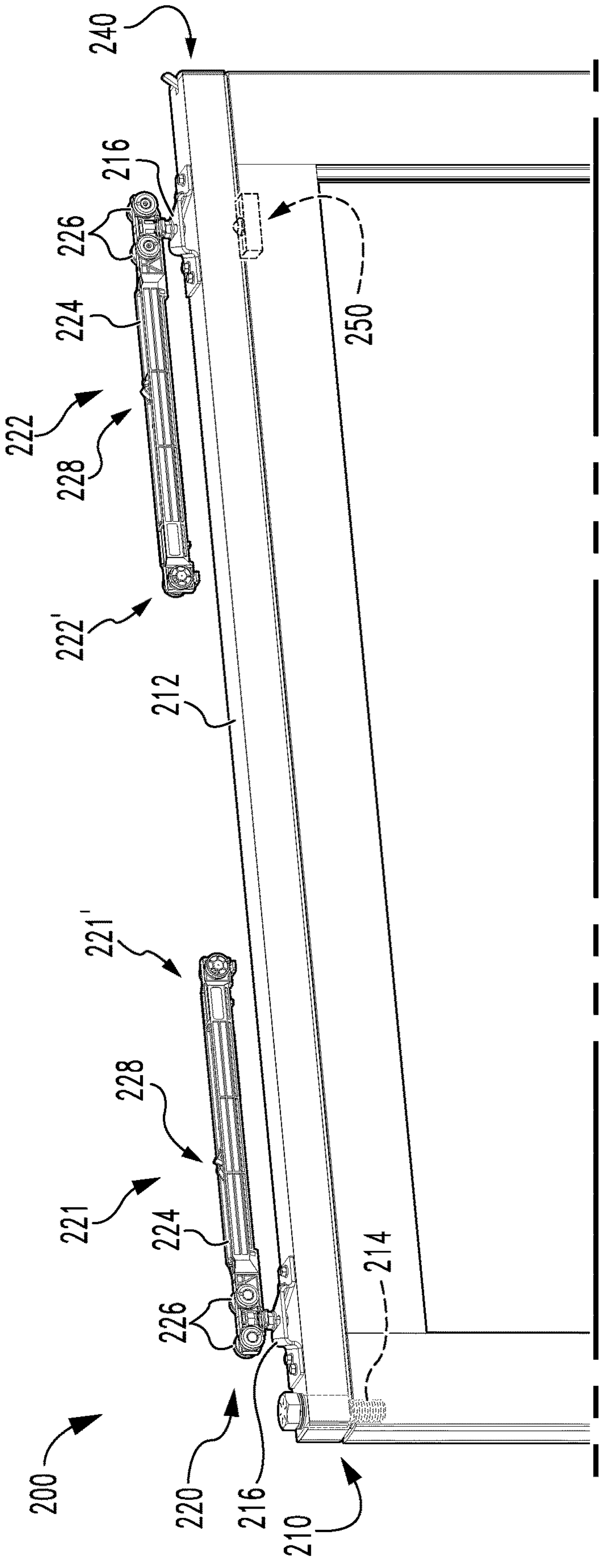
FIG. 8 is perspective view of a portion of the door assembly.

With additional reference to FIG. 8, the movable rail 210 extends longitudinally along the stationary rail 120, and generally includes a rail member 212 and a pivot hinge 214 through which the rail member 212 is engaged with the wing 230. As described herein, when the door assembly 200 is in its closed position, the pivot hinge 214 generally aligns with the post 133 of the guide mechanism 130 to thereby define a pivot axis 201 for the wing 230. A pair of brackets 216 are mounted to the top side of the movable rail 210 and facilitate engagement of the movable rail 210 with the support assembly 220. In the illustrated form, the movable rail 210 further includes a hanging bracket 219 (FIG. 14) operable to support the wing 230 as described in further detail below.

The support assembly 220 is engaged between the stationary rail 120 and the movable rail 210, and facilitates movement of the door assembly 200 relative to the frame assembly 100. The support assembly 220 generally includes a first or proximal support mechanism 221 and a second or distal support mechanism 222, each of which includes a housing 224 and at least one roller 226 rotatably mounted to the housing 224.

Figure 9:
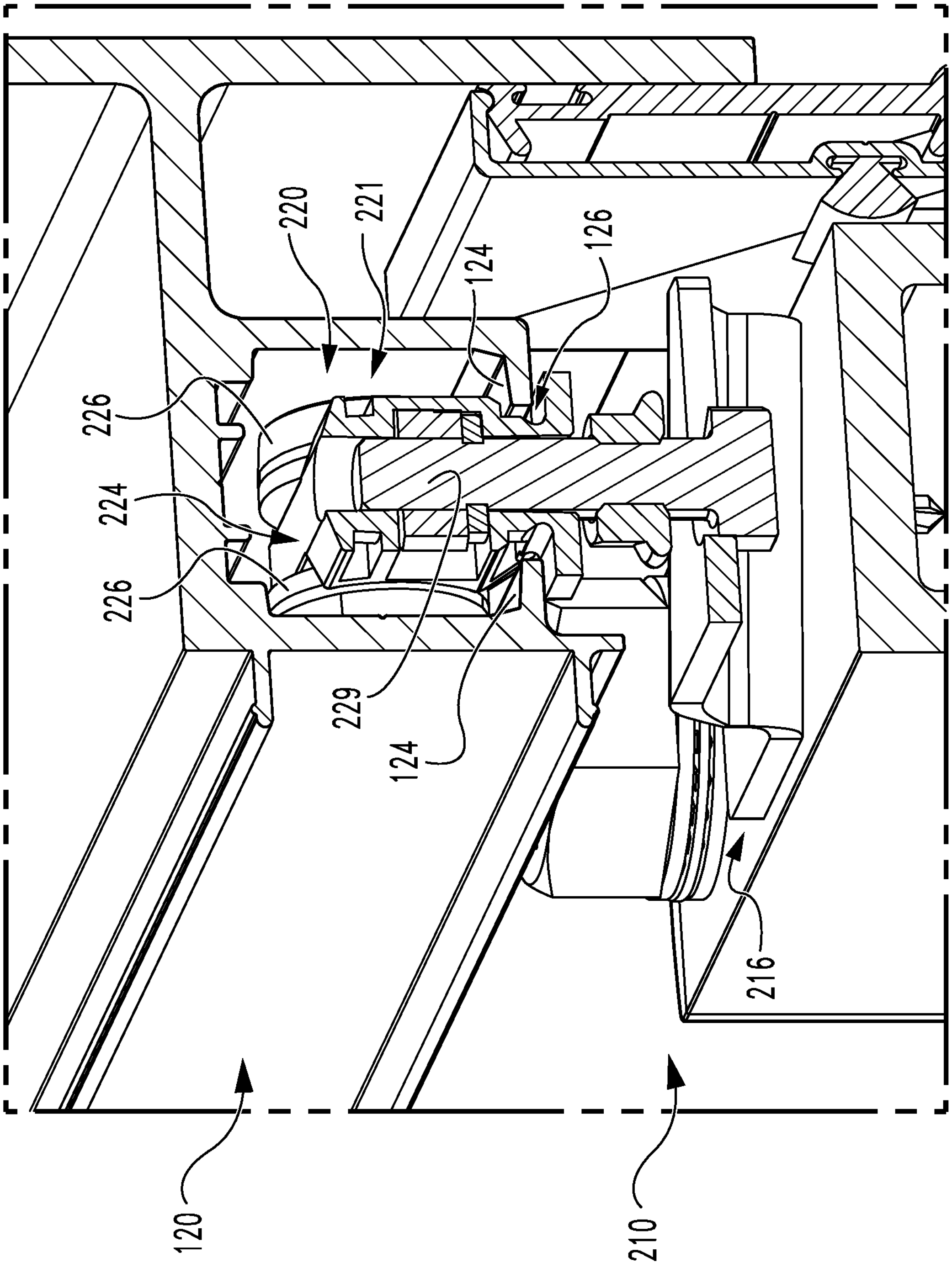
FIG. 9 is a cutaway view of a portion of the closure assembly.

With additional reference to FIG. 9, each of the support mechanisms 221, 222 is movably received at least partially within the channel 122 of the stationary rail 120. More particularly, each housing 224 is at least partially received in the channel 122 such that each roller 226 is supported by one of the flanges 124. In the illustrated form, a pin 229 is coupled to the housing 224, and extends through the slot 126 to engage a corresponding one of the brackets 216 such that the movable rail 210 hangs from the support assembly 220.

While other forms are contemplated, in the illustrated form, each support mechanism 221, 222 includes a corresponding movement assistance device 221', 222', each of which includes a hook 228 operable to engage a tang on the stationary rail 120 to facilitate movement of the door assembly 200 toward a corresponding position. More particularly, one of the movement assistance devices 221', 222' is configured to pull the door assembly 200 toward the fully closed position during sliding movement of the door assembly 200, and the other of the movement assistance devices 221', 222' is configured to pull the door assembly 200 toward the sliding open position during sliding movement of the door assembly 200. In embodiments that include one or more movement assistance devices, one or more of the movement assistance devices may, for example, be of the type described in U.S. patent application Ser. No. 16/404,003, filed May 6, 2019 and published as US 2020/0355004.

The illustrated wing 230 generally includes a frame portion 232 and a panel 231 mounted to the frame portion 232. In the illustrated form, the panel 231 is a transparent glazing. It is also contemplated that the panel 231 may be provided in another form, such as that of a non-transparent glazing or an opaque panel, which may or may not be provided as a glazing.

Figure 10:
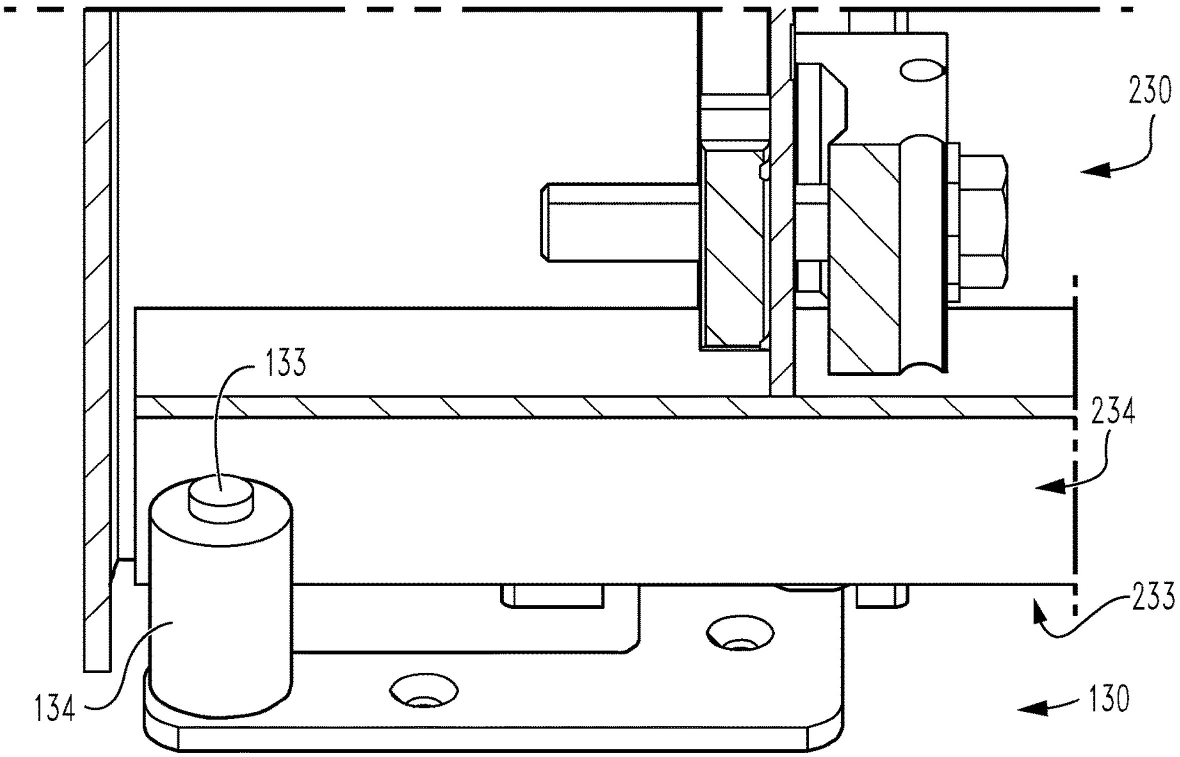
FIG. 10 is a perspective view of the guide mechanism received in a channel.

With additional reference to FIG. 10, a bottom edge 233 of the frame portion 232 includes a channel 234 operable to engage the guide mechanism 130 by receiving the post 133 and the bearing component 134 mounted thereto. With the bearing component 134 received in the channel 234, the guide mechanism 130 aids in constraining the door assembly 200 to its intended movement paths. For example, during sliding movement of the door assembly 200, the channel 234 moves along the bearing component 134, which can engage the walls of the channel 234 to discourage swaying and/or pivoting of the door assembly 200 about the longitudinal axis 91.

Figure 11:
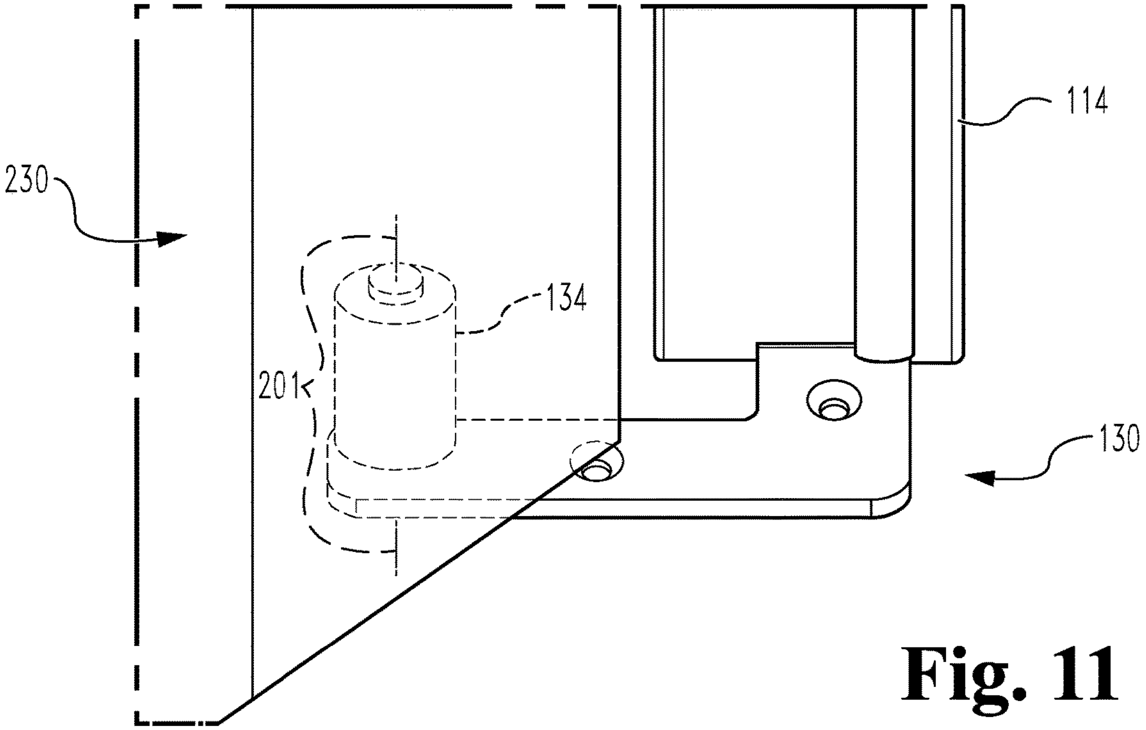
FIG. 11 is a perspective view of a portion of the closure assembly in the swinging open state.
Figure 12:
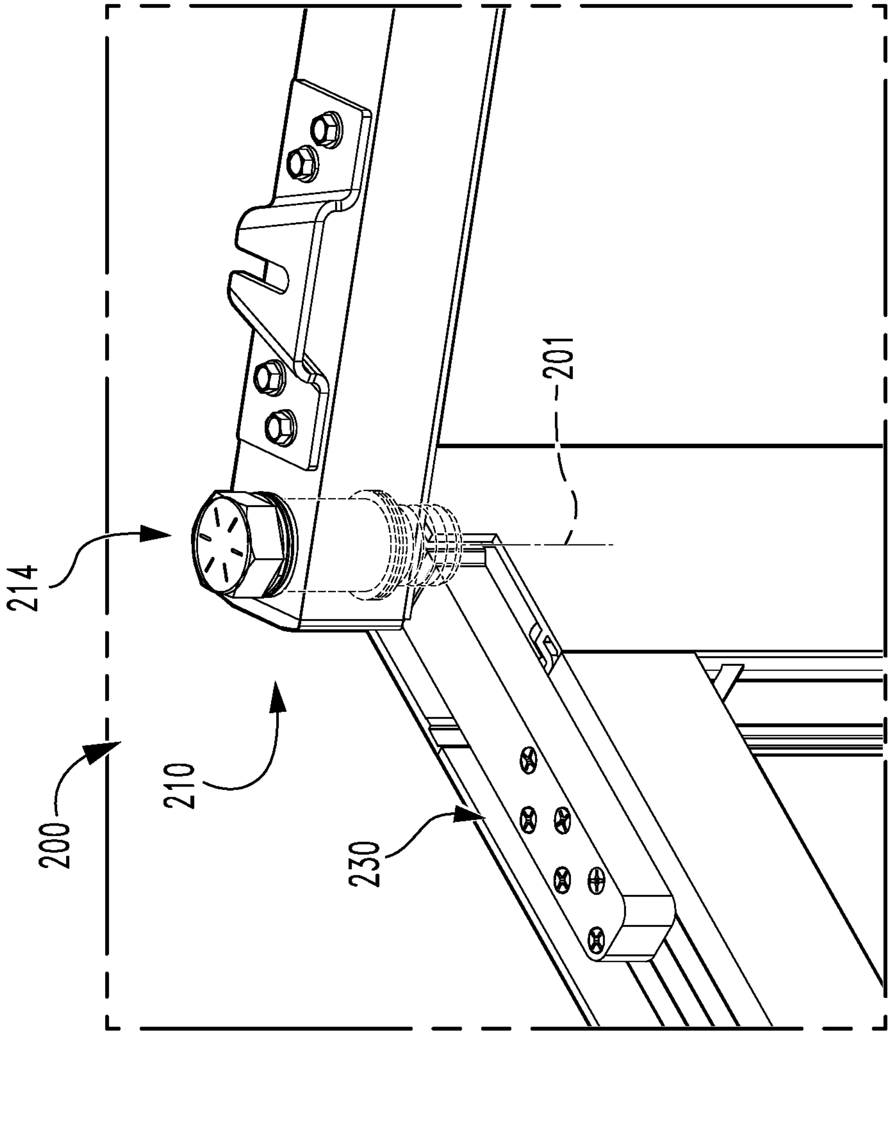
FIG. 12 is a perspective view of another portion of the closure assembly in the swinging open state.

With additional reference to FIGS. 11 and 12, when the door assembly 200 is in the fully closed position, the guide mechanism 130 cooperates with the pivot hinge 214 to define a pivot axis 201, about which the wing 230 is operable to pivot as described herein.

Figure 13:
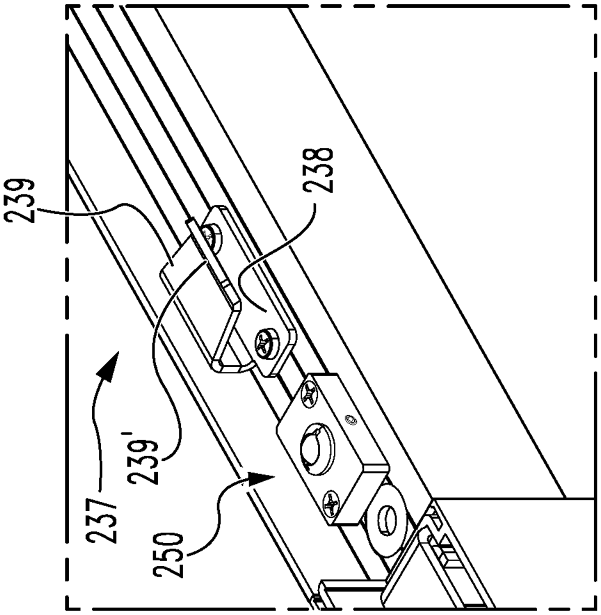
FIG. 13 illustrates a top edge of a wing including a detent mechanism according to certain embodiments and a bracket according to certain embodiments.
Figure 14:
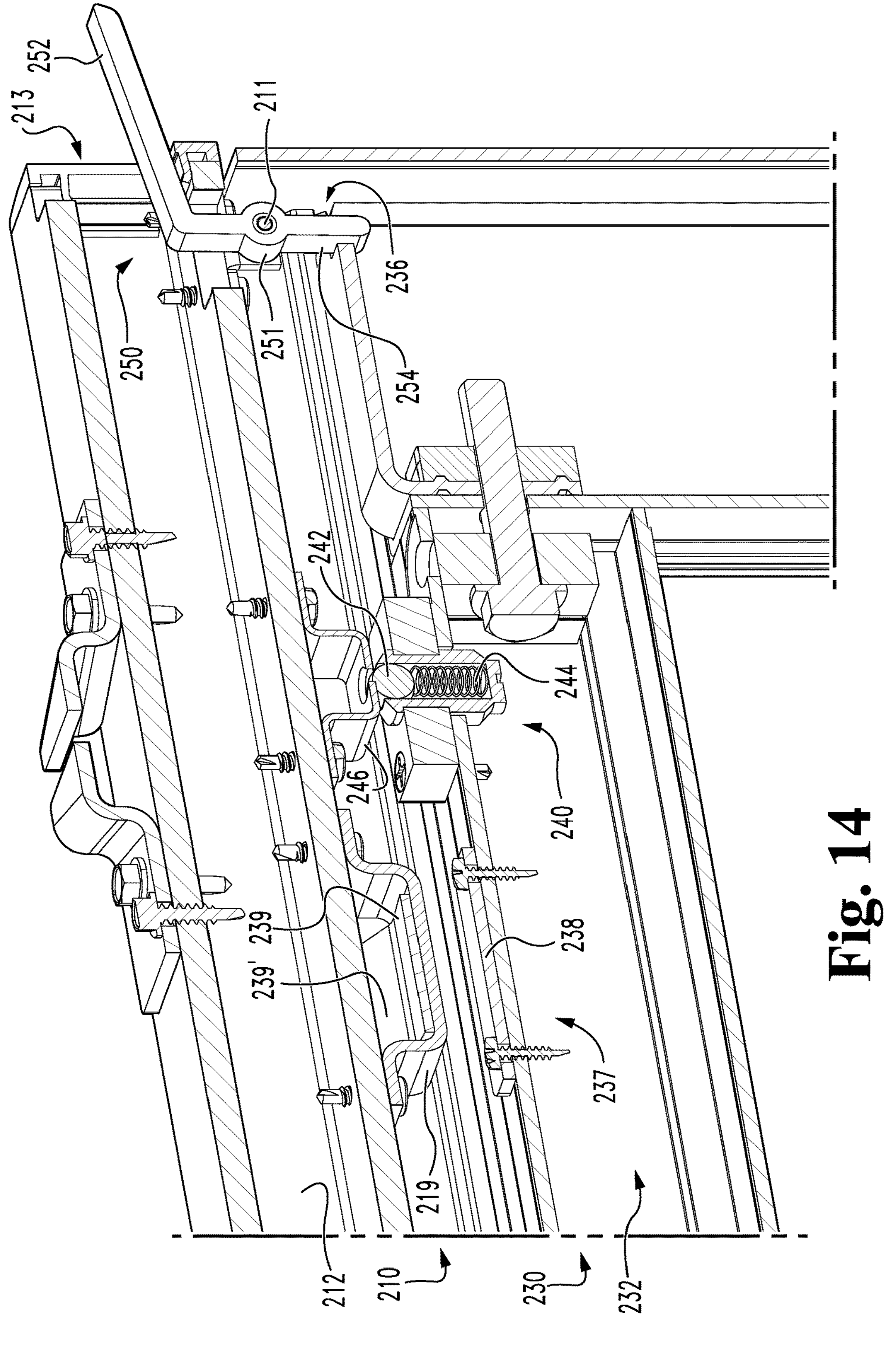
FIG. 14 is a cross-sectional view of a portion of the closure assembly.

With additional reference to FIGS. 13 and 14, the illustrated wing 230 further includes a support bracket 237 operable to engage the hanging bracket 219 such that the wing 230 is operable to hang from the pivot hinge 214 and the hanging bracket 219. The support bracket 237 includes a base portion 238 that is secured to the top of the wing 230, and an arm 239 coupled with the base portion 238. When the wing 230 is in the closed pivotal position, the arm 239 is engaged with and supported by the hanging bracket 219. When the wing 230 pivots towards its open pivotal position, the arm 239 disengages from the hanging bracket 219. As the wing 230 returns to its closed pivotal position, the arm 239 returns to engagement with the hanging bracket 219. In certain embodiments, the disengagement may cause a portion of the weight of the wing 230 to be transferred to the support roller 260 and/or cause the wing 230 to sag. In certain embodiments, the arm 239 includes a ramp 239' that engages the hanging bracket 219 as the wing 230 returns to its closed pivotal position, thereby pulling the distal side of the wing 230 upward and removing the sag to ensure proper positioning of the wing 230.

In the illustrated form, a first bracket in the form of a hanging bracket 219 is mounted to the movable rail 210, and a second bracket in the form of a support bracket 237 is mounted to the wing 230. It is also contemplated that this arrangement may be reversed such that a first bracket along the lines of the support bracket 237 is mounted to the movable rail 210 and a second bracket along the lines of the hanging bracket 219 is mounted to the wing 230. Moreover, it should be appreciated that while the ramp 239' of the illustrated embodiment is formed on the door-mounted bracket (i.e., the support bracket 237), it is also contemplated that a ramp may additionally or alternatively be provided on the rail-mounted bracket (i.e., the hanging bracket 219).

The detent mechanism 240 is configured to selectively retain the wing 230 in the closed pivotal position by discouraging swinging movement of the wing 230 from the closed pivotal position without preventing such swinging movement. In certain forms, the detent mechanism 240 may provide a particular degree of resistance to the swinging opening movement such that a user must apply force in excess of a threshold force to the wing 230 in order for the detent mechanism 240 to release. While other forms are contemplated, in the illustrated embodiment, the detent mechanism 240 is a ball detent mechanism including a ball 242 and a spring 244 that urges the ball 242 into engagement with a detent bracket 246.

The illustrated latch 250 is mounted in the movable rail 210, and is operable to engage each of the frame assembly 110 and the wing 230 to selectively prevent swinging movement of the wing 230. While other forms are contemplated, in the illustrated embodiment, the latch 250 includes a body portion 251 that is pivotably mounted to a post 211 of the movable rail 210, a frame-engaging first leg 252 operable to engage the frame assembly 110, and a wing-engaging second leg 254 operable to engage the wing 230. As described herein, the latch 250 is mounted for movement between a blocking position (FIG. 13) and an unblocking position (FIG. 14), and may be biased toward the blocking position. While the illustrated latch 250 is biased toward the blocking position by gravity, it should be appreciated that the latch 250 may be biased toward the blocking position in another manner, for example via the use of a spring, a magnet, and/or another form of biasing member.

While the illustrated latch 250 is mounted for pivotal movement between its blocking position and its unblocking position, it is also contemplated that a latch according to other embodiments may be mounted for another type of movement, such as sliding movement. Additionally, although other forms are contemplated, in the illustrated embodiment, the latch 250 is configured to selectively prevent pivotal movement of the wing 230 between the closed pivotal position and the open pivotal position, but is inoperable to prevent the linear sliding movement of the door assembly 200 between its closed linear position and its open linear position.

Figure 15:
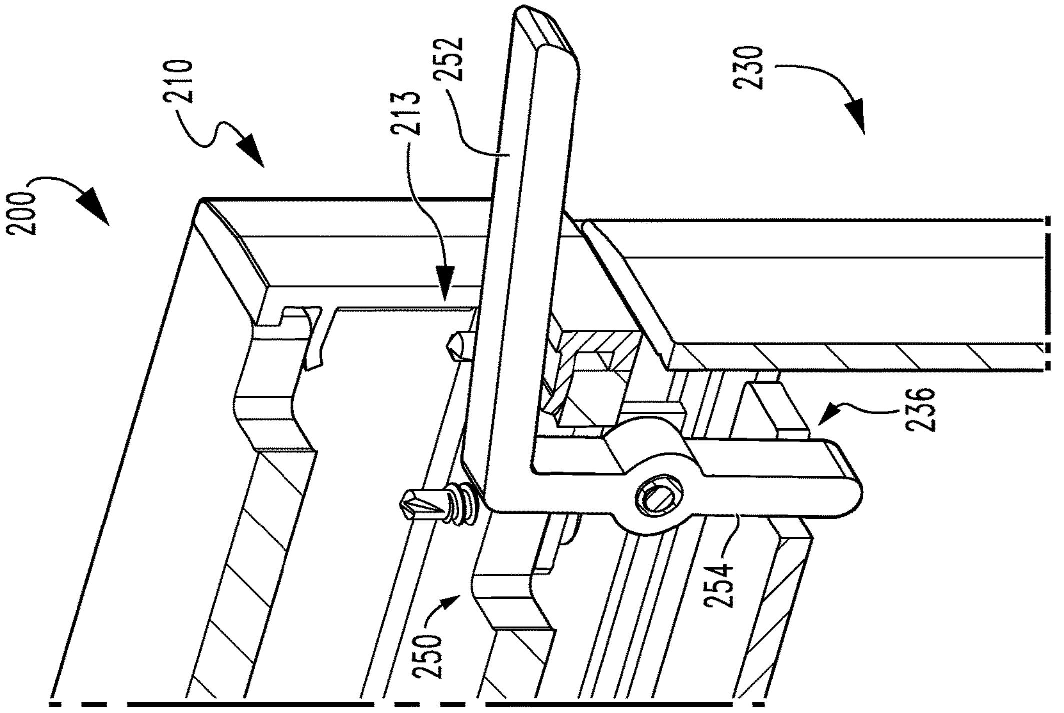
FIG. 15 is a cutaway view of a portion of the closure assembly, and illustrates a latch according to certain embodiments in a blocking position.

With additional reference to FIG. 15, illustrated therein is a portion of the door assembly 200 in an open linear position. In this state, the first arm 252 projects through an opening 213 beyond the distal side of the movable rail 210, and is not acted upon by the frame assembly 110. Accordingly, the latch 250 adopts the blocking position to which it is biased (e.g., by gravity). With the latch 250 in the blocking position, the second arm 254 is received in a notch 236 formed in the wing 230. As a result, the latch 250 prevents the swinging opening movement of the wing 230, thereby retaining the wing 230 in the closed pivotal position when the door assembly 200 is not in its closed linear position.

Figure 16:
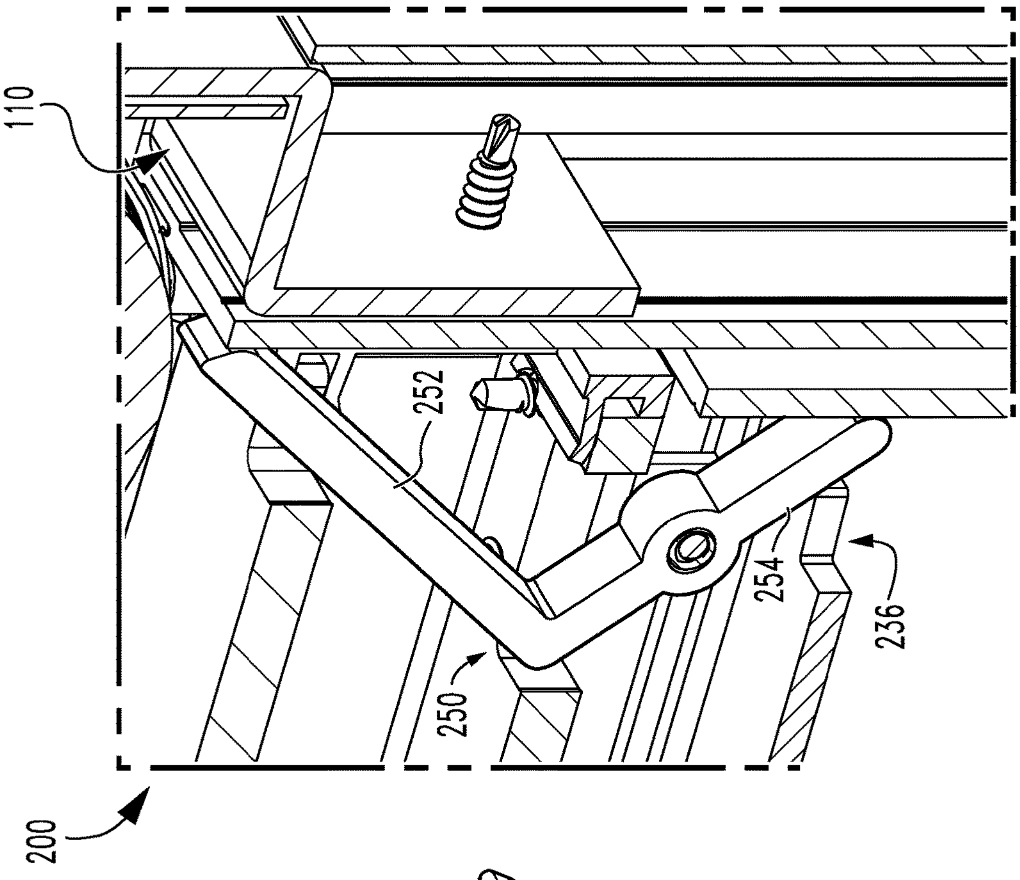
FIG. 16 is a cutaway view of a portion of the closure assembly, and illustrates the latch in an unblocking position.

With additional reference to FIG. 16, illustrated therein is a portion of the door assembly 200 in the closed linear position. As the door assembly 200 slides from its open linear position to its closed linear position, the frame assembly 110 engages the first arm 252 to thereby pivot the latch 250 to its unblocking position. With the latch 250 in its unblocking position, the second arm 254 is removed from the notch 236 such that swinging opening movement of the wing 230 is not prevented. As a result, the latch 250 permits the swinging opening movement of the wing 230 when the door assembly 200 is in its closed linear position, thereby enabling the swinging opening movement of the wing 230 from each and either side of the wing 230 without requiring that the user manually actuate an actuator (e.g., handle, pushbar, or thumb lever).

In the illustrated form, the first arm 252 projects beyond the distal edge of the door assembly 200 for engagement with the frame assembly 110. It is also contemplated that the first arm 252 may be inoperable to project beyond the distal edge of the door assembly 200. For example, the frame assembly 110 may instead include a projection that projects into the distal edge of the wing and triggers the latch 250 as the door assembly 200 approaches the closed linear position.

Figure 17:
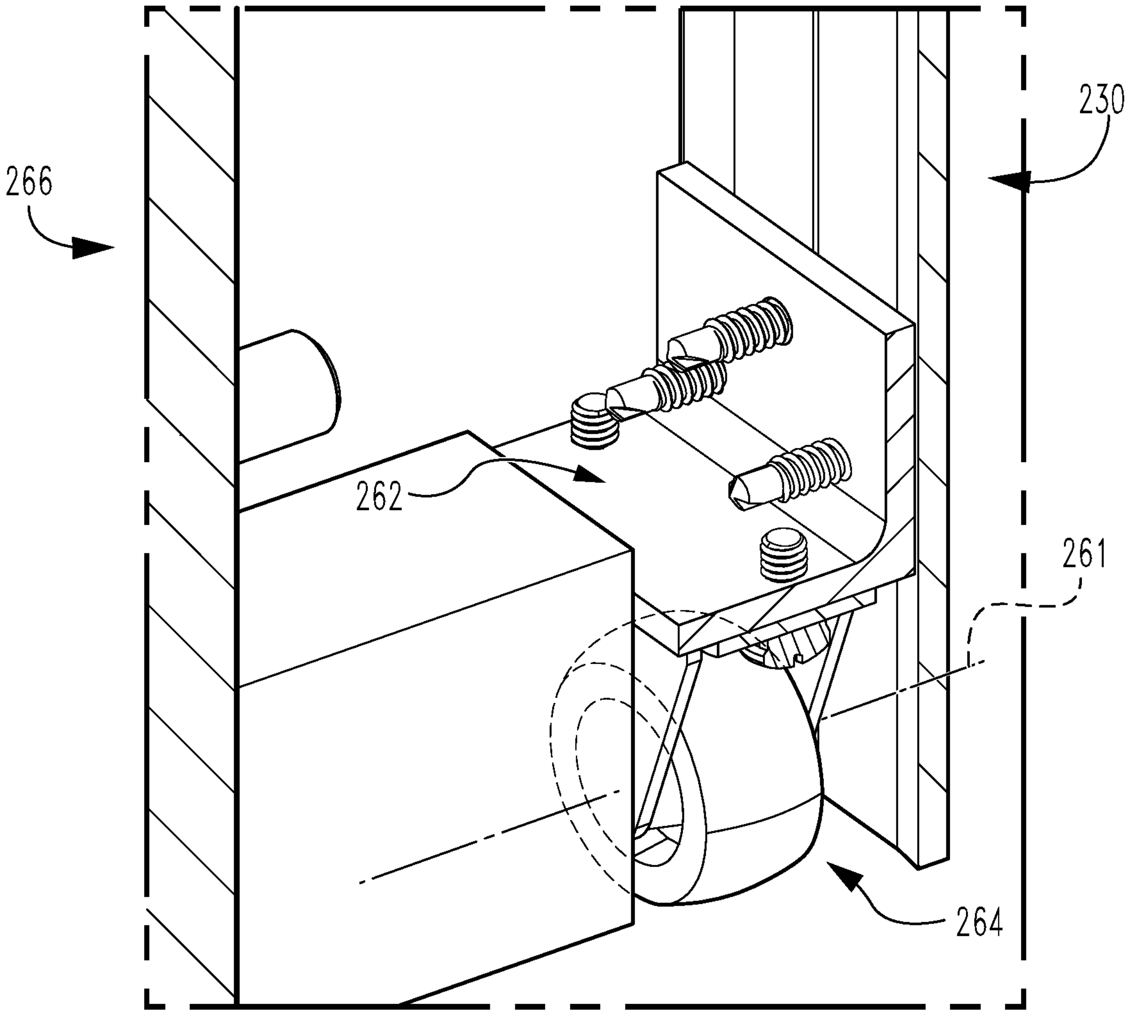
FIG. 17 is a cutaway view illustrating a roller according to certain embodiments.

With additional reference to FIG. 17, the support roller 260 generally includes a mounting bracket 262 and a roller 264 rotatably mounted to the support bracket 262. In the illustrated form, the mounting bracket 262 defines a fixed rotational axis 261 for the roller 264, which is provided in the form of a wheel. It is also contemplated that other forms of support rollers may be utilized. For example, the mounting bracket 262 may instead define a rotational axis that is rotatable about a vertical axis, and/or the roller 264 may be provided as a ball or other form of rotatable component.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A breakaway sliding door system, comprising:
- a frame assembly configured for mounting to a wall, the frame assembly comprising a top rail; and
- a door assembly mounted to the frame assembly for sliding movement between a closed linear position and an open linear position, the door assembly comprising:
  - a movable rail movably supported by the top rail;
  - a wing pivotably mounted to the movable rail;
  - a first bracket coupled to the movable rail; and
  - a second bracket coupled to the wing;
  - wherein the first bracket and the second bracket are operable to engage one another such that the wing hangs from the movable rail; and
  - wherein at least one of the first bracket or the second bracket comprises a ramp configured to lift the wing during closing pivotal movement of the wing.

2. The breakaway sliding door system of claim 1, wherein, with the door assembly in the closed linear position, the wing is pivotable about a pivot axis defined at least in part by the guide mechanism.

3. The breakaway sliding door system of claim 2, wherein the wing is pivotably coupled to the movable rail via a pivot hinge; and
- wherein, with the door assembly in the closed linear position, the pivot hinge is aligned with the guide mechanism and further defines the pivot axis.

4. The breakaway sliding door system of claim 1, further comprising a detent mechanism operable to discourage pivotal movement of the wing relative to the movable rail.

5. The breakaway sliding door system of claim 4, wherein the detent mechanism comprises a ball detent mechanism.

6. The breakaway sliding door system of claim 1, further comprising a latch operable to selectively prevent pivotal movement of the wing relative to the movable rail.

7. The breakaway sliding door system of claim 1, wherein the sliding door system lacks a bottom track.

8. The breakaway sliding door system of claim 1, wherein the guide mechanism comprises a vertically-oriented post and a bearing member mounted to the post.

9. The breakaway sliding door system of claim 8, wherein the bearing member is rotatable about the post.

10. The breakaway sliding door system of claim 1, wherein the frame assembly further comprises a guide mechanism;
- wherein a bottom edge of the wing comprises a channel; and
- wherein the guide mechanism projects into the channel and guides movement of the wing.

11. A breakaway sliding door system, comprising:
- a frame assembly configured for mounting to a wall, the frame assembly comprising a top rail; and
- a door assembly mounted to the frame assembly for sliding movement between a closed linear position and an open linear position, the door assembly comprising:
  - a movable rail movably supported by the top rail;
  - a wing pivotably mounted to the movable rail, wherein the wing is selectively pivotable relative to the movable rail between a closed pivotal position and an open pivotal position; and
  - a latch operable to selectively retain the wing in the closed pivotal position, wherein the latch is movable between a blocking position and an unblocking position, wherein the latch in the blocking position retains the wing in the closed pivotal position, and wherein the latch in the unblocking position does not retain the wing in the closed pivotal position;

wherein the latch is configured to permit the wing to move from the closed pivotal position toward the open pivotal position only when the door assembly is in the closed linear position.

12. The breakaway sliding door system of claim 11, further comprising a detent mechanism operable to discourage movement of the wing from the closed pivotal position toward the open pivotal position.

13. The breakaway sliding door system of claim 11, wherein, with the latch in the unblocking position, the wing is configured to pivot toward the open pivotal position in response to a pushing force applied to a first side of the door, and to pivot toward the open pivotal position in response to a pulling force applied to an opposite second side of the door.

14. The breakaway sliding door system of claim 11, wherein, with the latch in the unblocking position, the wing is operable to pivot toward the open position without requiring manual actuation of an actuator.

15. The breakaway sliding door system of claim 11, wherein, with the latch in the blocking position, a portion of the latch projects beyond a distal edge of the wing; and wherein the portion of the latch is configured to engage the frame assembly as the door assembly approaches the closed linear position to thereby drive the latch to the unblocking position.

16. The breakaway sliding door system of claim 11, wherein the latch is mounted for pivotal movement between the blocking position and the unblocking position.

17. The breakaway sliding door system of claim 11, wherein the latch is biased toward the blocking position.

18. The breakaway sliding door system of claim 17, wherein the latch is biased toward the blocking position by gravity.

19. The breakaway sliding door system of claim 11, wherein the latch is inoperable to prevent linear movement of the door assembly.

20. The breakaway sliding door system of claim 11, wherein the frame assembly further comprises a guide that projects into a channel formed on a bottom edge of the wing to thereby guide both linear movement of the wing and pivotal movement of the wing.

* * * * *